United States Patent
Higuchi et al.

(10) Patent No.: US 11,140,144 B2
(45) Date of Patent: Oct. 5, 2021

(54) IOT DATA COLLECTION SYSTEM, IOT DATA COLLECTION METHOD, MANAGEMENT DEVICE, MANAGEMENT PROGRAM, AGENT DEVICE, AND AGENT PROGRAM

(71) Applicant: SAISON INFORMATION SYSTEMS CO., LTD., Tokyo (JP)

(72) Inventors: Yoshihisa Higuchi, Tokyo (JP); Kazuya Nohara, Tokyo (JP); Jun Otake, Tokyo (JP); Tomohiro Harada, Tokyo (JP); Kenichi Tanaka, Tokyo (JP)

(73) Assignee: Saison Information Systems Co., Ltd., Tokyo (JP)

(*) Notice: Subject to any disclaimer, the term of this patent is extended or adjusted under 35 U.S.C. 154(b) by 265 days.

(21) Appl. No.: 16/479,579

(22) PCT Filed: Jan. 19, 2017

(86) PCT No.: PCT/JP2017/001673
§ 371 (c)(1),
(2) Date: Jul. 19, 2019

(87) PCT Pub. No.: WO2018/134937
PCT Pub. Date: Jul. 26, 2018

(65) Prior Publication Data
US 2019/0372952 A1 Dec. 5, 2019

(51) Int. Cl.
*G06F 15/16* (2006.01)
*H04L 29/06* (2006.01)
(Continued)

(52) U.S. Cl.
CPC .......... *H04L 63/08* (2013.01); *H04L 41/046* (2013.01); *H04L 63/061* (2013.01); *H04L 67/12* (2013.01)

(58) Field of Classification Search
CPC ..... G06F 21/44; H04L 41/046; H04L 63/061; H04L 63/08; H04L 67/12; H04L 9/32
See application file for complete search history.

(56) References Cited

U.S. PATENT DOCUMENTS

| 2016/0081133 | A1* | 3/2016 | Kim | H04W 48/20 370/329 |
| 2017/0099176 | A1* | 4/2017 | Jain | H04L 67/12 |
| 2018/0270064 | A1* | 9/2018 | Gehrmann | H04L 9/3273 |

FOREIGN PATENT DOCUMENTS

| CN | 102547989 A | 7/2012 |
| JP | 2003296279 A | 10/2003 |

(Continued)

OTHER PUBLICATIONS

International Search Report issued in International Application No. PCT/JP2017/001673, dated Apr. 25, 2017, 2 pages.

*Primary Examiner* — Normin Abedin
(74) *Attorney, Agent, or Firm* — Finnegan, Henderson, Farabow, Garrett & Dunner, LLP

(57) ABSTRACT

Provided is an IoT data collection system 100 including an agent device 10 configured to acquire IoT data, a management device 20 configured to manage the agent device 10, and a server device 30 configured to receive the IoT data from the agent device 10. The agent device 10 includes a first transmission unit configured to transmit an authentication activation key to the management device 20 at startup. The management device 20 includes a collation unit configured to collate a registered activation key and the authentication activation key, and a transmission unit configured to transmit an authentication agent ID to the agent device 10 when the collation result is matched. The agent device 10 further includes a second transmission unit configured to transmit the IoT data and the authentication agent ID to the server device 30. The server device 30 includes a collation
(Continued)

unit configured to collate a registered agent ID and the authentication agent ID, and a reception unit configured to receive the IoT data from the agent device 10 when the collation result is matched.

9 Claims, 6 Drawing Sheets

(51) Int. Cl.
*H04L 12/24* (2006.01)
*H04L 29/08* (2006.01)

(56) References Cited

FOREIGN PATENT DOCUMENTS

| | | |
|---|---|---|
| JP | 2011248709 A | 12/2011 |
| JP | 2013172179 A | 9/2013 |
| JP | 2015070573 A | 4/2015 |
| JP | 2015106349 A | 6/2015 |
| JP | 2016045964 A | 4/2016 |
| WO | WO2015/025830 | 3/2017 |

* cited by examiner

IOT DATA COLLECTION SYSTEM, IOT DATA COLLECTION METHOD, MANAGEMENT DEVICE, MANAGEMENT PROGRAM, AGENT DEVICE, AND AGENT PROGRAM

CROSS-REFERENCE TO RELATED APPLICATIONS

This application is a national phase application of International Application No. PCT/JP2017/001673, filed Jan. 19, 2017, the contents of which are incorporated herein by reference in its entirety.

TECHNICAL FIELD

The present invention relates to an IoT data collection system, an IoT data collection method, a management device, a management program, an agent device, and an agent program.

BACKGROUND ART

In recent years research is ongoing on a technique called IoT (Internet of Things). IoT is a technique to perform automatic measurement, automatic recognition, automatic control and the like for things by connecting various things, not limited to computers, to such a communication network as the Internet.

Concerning IoT, Patent Document 1 discloses a method for IoT device configuration, in which a device configuration is simulated in an IoT database, and it is determined whether this device configuration can be used, and if not, the device configuration is reconstructed so that an alternative IoT device is included.

CITATION LIST

Patent Document

Patent Document 1: Patent Publication JP-A-2016-45964

SUMMARY

Technical Problem

In some cases, in order to collect IoT data on a server device, agent devices which acquire IoT data are installed, and the IoT data is transferred from the agent devices to the server device. The agent devices and the server device are connected via the Internet, and the server accepts only the data transferred from an authenticated agent device, whereby security in transferring the IoT data is ensured.

However, if different authentication keys are assigned to a plurality of agent devices respectively, management of the agent devices becomes more complicated as a number of agent devices to be installed increases. Further, if an identical authentication key is assigned to a plurality of agent devices respectively, security of the data transfer by all the agent devices may be at risk should this authentication key be leaked.

With the foregoing in view, it is an object of the present invention to provide an IoT data collection system, an IoT data collection method, a management device, a management program, an agent device and an agent program which implement both easy management of the agent devices and security of the data transfer.

Solution to Problem

An IoT data collection system according to an aspect of the invention is an IoT data collection system including an agent device configured to acquire IoT data, a management device configured to manage the agent device, and a server device configured to receive the IoT data from the agent device. The agent device includes a first transmission unit configured to transmit an authentication activation key to the management device at startup. The management device includes: a collation unit configured to collate a registered activation key which is registered in advance and the authentication key; and a transmission unit configured to transmit an authentication agent ID which is different from the registered activation key, to the agent device when the result of collating the registered activation key and the authentication activation key is matched. The agent device further includes a second transmission unit configured to transmit the IoT data and the authentication agent ID to the server device, wherein the server device includes: a collation unit configured to collate a registered agent ID which is registered in advance and the authentication agent ID; and a reception unit configured to receive the IoT data from the agent device when the result of collating the registered agent ID and the authentication agent ID is matched.

According to this aspect, the authentication activation key and the registered activation key are collated when the agent device starts up, and the authentication agent ID is automatically assigned to the agent device if the collation is confirmed. This prevents startup of an agent device due to an illegal activation attempt and leakage of the authentication agent ID, and also makes the ID management of the agent devices easier. In the case of transferring the IoT data from the agent device to the server device, the authentication agent ID and the registered agent ID are collated, and security of the transfer is ensured. Even if the authentication agent ID is leaked, the agent device cannot be activated because the authentication activation key is not available, which ensures security of transfer of the IoT data.

In the above aspect, the agent device further includes a third transmission unit configured to transmit a request for information to specify latest operation setting of the second transmission unit to the management device periodically at least before acquiring IoT data. The management device further includes an operation setting transmission unit configured to transmit the information to specify the latest operation setting to the agent device when the request for the information to specify the latest operation setting is received. The agent device further includes a determination unit configured to compare the information to specify the latest operation setting and the information to specify the current operation setting of the second transmission unit, and determine whether it is necessary to perform the operation setting of the second transmission unit based on the latest operation setting. The third transmission unit transmits a request for the latest operation setting of the second transmission unit to the management device when the determination unit determines that it is necessary to perform the operation setting of the second transmission unit based on the latest operation setting. The operation setting transmission unit transmits the latest operation setting to the agent device when the request for the latest operation setting is received. The agent device may further include a setting unit configured to perform the operation setting of the second transmission unit based on the latest operation setting.

According to this aspect, the agent device itself can update the operation setting to the latest operation setting under a stable operation environment at a timing when high load processing is not in-execution, such as transferring IoT data from the agent device to the server device, and the IoT data can be acquired and transferred to the server device based on the latest operation setting. Further, determination of whether the operation setting of the second transmission unit of the agent device is required can be distributed to each agent device. This prevents the concentration of the loads of this processing on the management device, even if a number of agent devices increases, and maintains and improves the availability of the IoT data collection system as a whole. Furthermore, the agent device and the management device can execute the processing to update the operation setting by autonomous distributed cooperative control. This maintains low management man-hours of the administrator, even if a number of agent devices increases.

In the above aspect, the setting unit may set a transfer condition, which indicates a condition to transmit the IoT data to the server device, based on the latest operation setting.

According to this aspect, the condition to transfer IoT data from the agent device to the server device can be appropriately changed, and efficient transfer, in accordance with the characteristic of the IoT data, can be performed.

In the above aspect, the management device may further include a transmission unit configured to transmit an operation instruction for a predetermined operation, which the agent device executes before or after transmitting the IoT data, to the agent device. The agent device may further include an operation execution unit configured to execute the predetermined operation before or after transmitting the IoT data, based on the operation instruction.

According to this aspect, the operation performed by the agent device can be specified before or after transferring the IoT data to the server device, and more diversified data processing can be implemented.

An IoT data collection method according to an aspect of the present invention is a method of collecting IoT data using an agent device configured to acquire IoT data, a management device configured to manage the agent device, and a server device configured to receive the IoT data from the agent device, which comprises the steps of: transmitting an authentication activation key from the agent device to the management device when the agent device starts up; collating a registered activation key which is registered in advance and the authentication activation key using the management device; transmitting an authentication agent ID, which is different from the registered activation key, from the management device to the agent device when the result of collating the registered activation key and the authentication activation key by the management device is matched; transmitting the IoT data and the authentication agent ID from the agent device to the server device; collating a registered agent ID which is registered in advance and the authentication agent ID using the server device; and the server device receiving the IoT data from the agent device when the result of collating the registration agent ID and the authentication agent ID by the server device is matched.

According to this aspect, the authentication activation key and the registered activation key are collated when the agent device starts up, and the authentication agent ID is automatically assigned to the agent device if the collation is confirmed. This prevents startup of an agent device due to an illegal activation attempt and leakage of the authentication agent ID, and also makes the ID management of the agent devices easier. In the case of transferring the IoT data from the agent device to the server device, the authentication agent ID and the registered agent ID are collated, and security of the transfer is ensured. Even if the authentication agent ID is leaked, the agent device cannot be activated because the authentication activation key is not available, which ensures security of transfer of the IoT data.

A management device according to an aspect of the present invention is a management device which manages an agent device configured to acquire IoT data, including: a collation unit configured to collate a registered activation key which is registered in advance and an authentication activation key which is transmitted from the agent device to the management device when the agent device starts up; and a transmission unit configured to transmit an authentication agent ID, which is different from the registered activation key, to the agent device when the result of collating the registered activation key and the authentication activation key is matched.

According to this aspect, the authentication activation key and the registered activation key are collated when the agent device starts up, and the authentication agent ID is automatically assigned to the agent device if the collation is confirmed. This prevents startup of an agent device due to an illegal activation attempt and leakage of the authentication agent ID, and also makes the ID management of the agent devices easier.

A management program according to an aspect of the present invention is a management program causing a computer, included in a management device which manages an agent device configured to acquire IoT data, to function as: a collation unit configured to collate a registered activation key which is registered in advance and an authentication activation key which is transmitted from the agent device to the management device when the agent device starts up; and a transmission unit configured to transmit an authentication agent ID, which is different from the registered activation key, to the agent device when the result of collating the registered activation key and the authentication activation key is matched.

According to this aspect, the authentication activation key and the registered activation key are collated when the agent device starts up, and the authentication agent ID is automatically assigned to the agent device if the collation is matched. This prevents startup of an agent device due to an illegal activation attempt and leakage of the authentication agent ID, and also makes the ID management of the agent devices easier.

An agent device according to an aspect of the present invention is an agent device configured to acquire IoT data, including: a first transmission unit configured to transmit an authentication activation key to a management device which manages the agent device at startup; and a second transmission unit configured to transmit an authentication agent ID and the IoT data to the server device, the authentication agent ID being different from a registered activation key which is registered in the management device in advance and being transmitted from the management device to the agent device when the management device collates the registered activation key and the authentication activation key, and the result of collating the registered activation key and the authentication activation key is matched.

According to this aspect, the authentication activation key and the registered activation key are collated when the agent device starts up, and the authentication agent ID is automatically assigned to the agent device if the collation is confirmed. This prevents startup of the agent device due to an illegal activation attempt and leakage of the authentication agent ID, and also makes the ID management of the agent devices easier. When the IoT data is transferred from an agent device to the server device, the authentication agent ID and the registered agent ID are collated, whereby security of the transfer is ensured.

An agent program according to an aspect of the present invention is an agent program causing a computer, which is included in an agent device configured to acquire IoT data, to function as: a first transmission unit configured to transmit an authentication activation key to a management device which manages the agent device at startup; and a second transmission unit configured to transmit an authentication agent ID and the IoT data to the server device, the authentication agent ID being different from a registered activation key which is registered in the management device in advance and being transmitted from the management device to the agent device when the management device collates the registered activation key and the authentication activation key, and the result of collating the registered activation key and the authentication activation key is matched.

According to this aspect, the authentication activation key and the registered activation key are collated when the agent device starts up, and the authentication agent ID is automatically assigned to the agent device if the collation is confirmed. This prevents startup of an agent device due to an illegal activation attempt and leakage of the authentication agent ID, and also makes the ID management of the agent devices easier. When the IoT data is transferred from the agent device to the server device, the authentication agent ID and the registered agent ID are collated, whereby security of the transfer is ensured.

Advantageous Effects of Invention

According to the present invention, an IoT data collection system, an IoT data collection method, a management device, a management program, an agent device and an agent program, which implement both easy management of the agent device and security of the data transfer can be provided.

DESCRIPTION OF EMBODIMENTS

Figure 1:
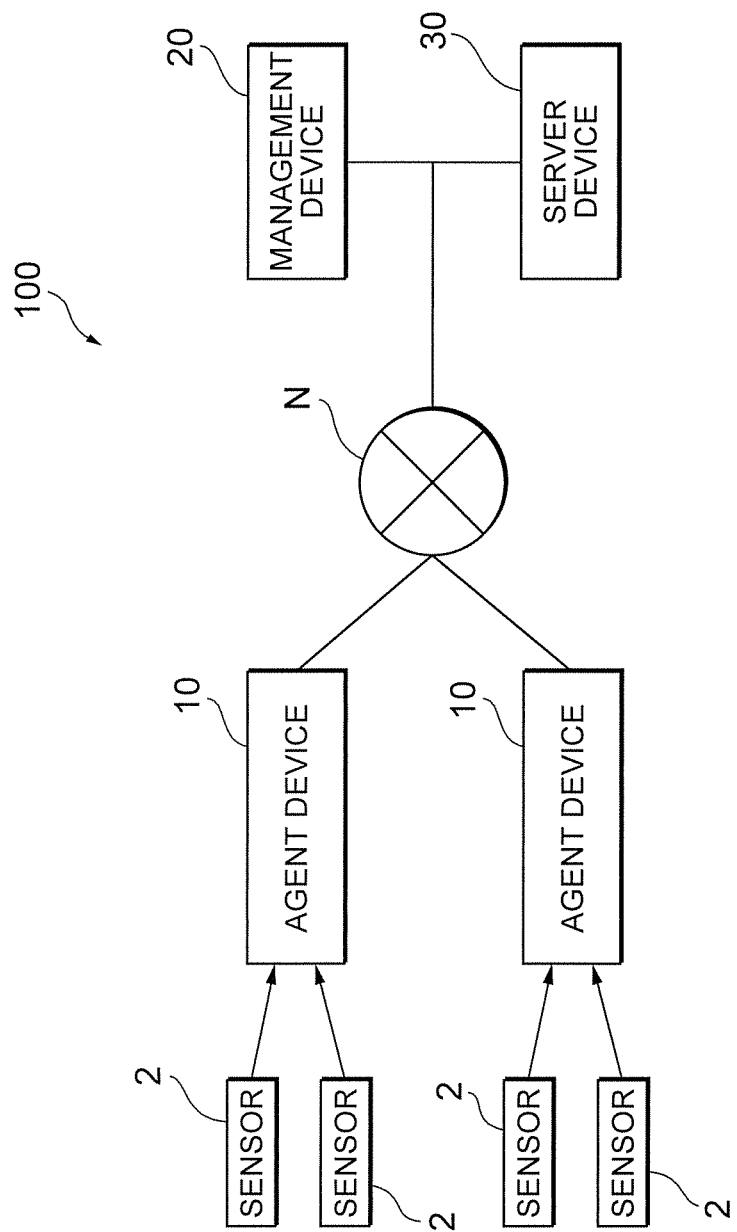
FIG. 1 is a diagram depicting an outline of an IoT data collection system according to an embodiment of the present invention.

Embodiments of the present invention will be described with reference to the accompanying drawings. In the drawings, elements having the same reference sign have the same or similar configuration.

FIG. 1 is a diagram depicting an overview of an IoT data collection system 100 according to an embodiment of the present invention. The IoT data collection system 100 includes an agent device 10 which acquires IoT data, a management device 20 which manages the agent device 10, and a server device 30 which receives the IoT data from the agent device 10. The agent device 10, the management device 20 and the server device 30 are connected via a communication network N respectively, and transmit/receive IoT data and authentication data to/from each other. The communication network N may be a communication network, such as the Internet and a LAN (Local Area Network).

The agent device 10 is connected with one or more sensors 2, and is connected to the communication network N, and in this state the agent device 10 acquires IoT data from each sensor 2. The agent device 10 according to this embodiment is a gateway device which connects each sensor 2 and the communication network N. In this description, IoT data refers to data for performing automatic measurement, automatic recognition, automatic control or the like of things, and is sensing data outputted from the sensor 2 in the case of the IoT data collection system 100 according to this embodiment. Beside the sensing data, the IoT data may include such statistic data as operation log data of a machine and POS (Points Of Sales) data. The IoT data may also be instruction data to instruct an operation to the server device 30.

The management device 20 manages activation and operating settings of the agent device 10. Activation refers to setting the agent device 10 to an operational state when the agent device 10 starts up. One management device 20 may be installed for a plurality of agent devices 10, and may collectively manage the plurality of agent devices 10. The server device 30 receives IoT data from the agent device 10, and stores the IoT data. The server device 30 may include a database to store the IoT data, or may be connected to a database via the communication network N.

Figure 2:
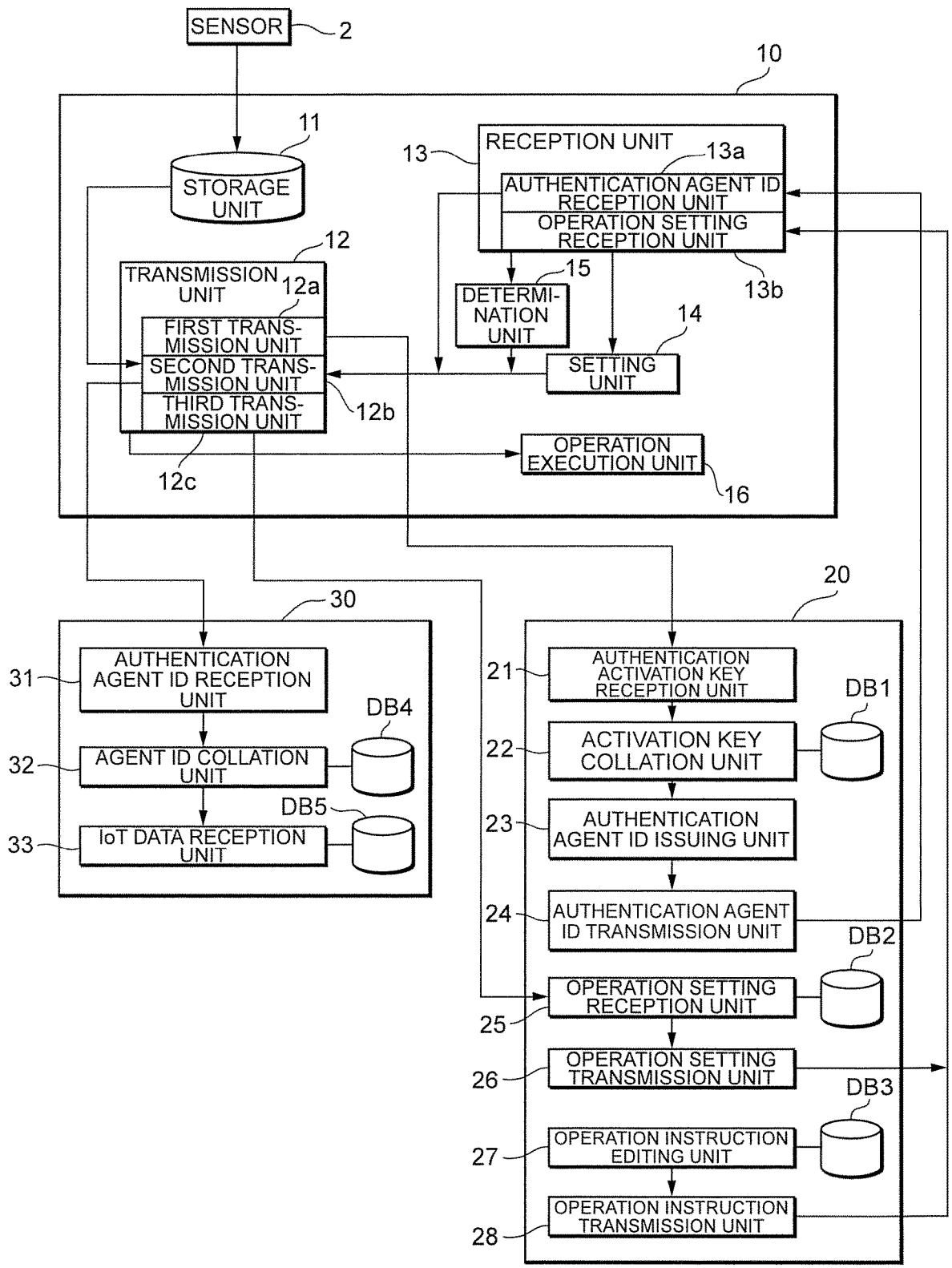
FIG. 2 is a functional block diagram of an agent device, a management device and a server device according to the embodiment of the present invention.

FIG. 2 is a functional block diagram of the agent device 10, the management device 20 and the server device 30 according to the embodiment of the present invention. The agent device 10 includes a storage unit 11, a transmission unit 12, a reception unit 13, a setting unit 14, a determination unit 15 and an operation execution unit 16. The management device 20 includes an authentication activation key reception unit 21, an activation key collation unit 22, an authentication agent ID issuing unit 23, an authentication agent ID transmission unit 24, an operation setting reception unit 25, an operation setting transmission unit 26, an operation instruction editing unit 27, an operation instruction transmission unit 28, a registered activation key database DB1, an operation setting database DB2, and an operation instruction database DB3. The registered activation key database DB1, the operation setting database DB2 and the operation instruction database DB3 may be disposed separately from the management device 20. The server device 30 includes an authentication agent ID reception unit 31, an agent ID collation unit 32, an IoT data reception unit 33, a registered agent ID database DB4, and an IoT database DB5. The registered agent ID database DB4 and the IoT database DB5 may be disposed separately from the server device 30. The management device 20 and the server device 30 may include a general-purpose storage unit respectively, so as to store various data.

The storage unit 11 of the agent device 10 temporarily stores IoT data acquired from the sensor 2. The transmission unit 12 includes: a first transmission unit 12a which transmits an authentication activation key to the management device 20 when the device is started up when the activation is not completed; a second transmission unit 12*b* which transmits the IoT data and an authentication agent ID to the server device 30; and the third transmission unit 12*c* which transmits a request for information to specify the latest operation setting of the second transmission unit 12*b* to the management device 20 periodically at least before acquiring the IoT data. Here the authentication activation key is stored in the storage unit 11 of the agent device 10 in advance, and the first transmission unit 12*a* transmits the authentication activation key, which is stored in the storage unit 11, to the management device 20. The reception unit 13 includes: an authentication agent ID reception unit 13*a* which receives an authentication agent ID from the management device 20; and an operation setting reception unit 13*b* which receives information to specify the latest operation setting of the second transmission unit 12*b* and the latest operation setting from the management device 20. The authentication agent ID received by the authentication agent ID reception unit 13*a* is stored in the storage unit 11 of the agent device 10. Then the second transmission unit 12*b* transmits the authentication agent ID, which is stored in the storage unit 11, to the server device 30. If the management device 20 returns the latest operation setting in response to the request for information to specify the latest operation setting, which the third transmission unit 12*c* transmitted, the operation setting reception unit 13*b* receives the information to specify the latest operation setting. Here the determination unit 15 compares the information to specify the latest operation setting of the second transmission unit 12*b* and the information to specify the current operation setting of the second transmission unit 12*b*, and determines whether an operation setting of the second transmission unit 12*b* is necessary based on the latest operation setting. If the determination unit 15 determines that the operation setting of the second transmission unit 12*b* is necessary, the third transmission unit 12*c* transmits a request for the latest operation setting to the management device 20, and the operation setting reception unit 13*b* receives the latest operation setting returned from the management device 20, and stores the latest operation setting in the storage unit 11. Then based on the latest operation setting stored in the storage unit 11, the setting unit 14 performs the operation setting of the second transmission unit 12*b*. The operation execution unit 16 executes a predetermined operation before or after transmitting the IoT data, based on the operation instruction stored in the storage unit 11 of the agent device 10.

The authentication activation key reception unit 21 of the management device 20 receives the authentication activation key transmitted from the first transmission unit 12*a* of the agent device 10. The activation key collation unit 22 collates the registered activation key, which is registered in the registered activation key database DB1 in advance, and the authentication activation key. The authentication agent ID issuing unit 23 issues an authentication agent ID linked to the agent device 10 when the result of collating the authentication activation key and the registered activation key us matched. The authentication agent ID may be information that is different from the registered activation key. An authentication agent ID transmission unit 24 transmits the authentication agent ID to the agent device 10. The authentication agent ID is stored in a non-volatile storage area of the management device 20, for example. Here the authentication agent ID is linked to information to specify the agent device 10 (e.g. serial number or IP address of the agent ID) and stored. The management device 20 can determine whether activation completed by checking whether the authentication agent ID is stored, for example. The method of determining the activation state is not limited to this, for any method may be used, such as storing a flag indicating the activation state in a non-volatile storage area. The authentication activation key and the registered activation key are not necessary identical. The authentication activation key and the registered activation key may be different from each other as long as the activation key collation unit 22 can confirm collation thereby. Further, the authentication activation key may be common to a plurality of agent devices 10, and the authentication agent ID may be an ID that is unique to each of a plurality of agent devices 10.

The operation setting reception unit 25 of the management device 20 receives a request, from the third transmission unit 12*c* of the agent device 10, to send information to specify the latest operation setting of the second transmission unit 12*b* of the agent device 10. The management device 20 searches the information, to specify the latest operation setting of the second transmission unit 12*b* linked to the agent device 10, from the operation setting database DB2. Here the information to specify the operation setting may be version information of the operation setting. The content of the operation setting of the second transmission unit 12*b* stored in the operation setting database DB2 is edited by a user of the management device 20 (e.g. administrator of the IoT data collection system 100), and is managed so that the latest version can be discerned based on the version information. When the request for the information to specify the latest operation setting is received from the agent device 10, the operation setting transmission unit 26 transmits the searched information to specify the latest operation setting to the agent device 10. Further, the operation setting reception unit 25 receives a request for the latest operation setting of the second transmission unit 12*b* from the agent device 10. When the request for the latest operation setting is received by the operation setting reception unit 25, the operation setting transmission unit 26 searches for the latest operation setting of the second transmission unit 12*b* linked to the agent device 10 from the operation setting database DB2, and transmits the searched latest operation setting to the agent device 10. The operation setting includes information on the transfer of the IoT data from the agent device 10 to the server device 30, for example. In this description, information on the operation setting is simply referred to as the "operation setting".

The operation instruction editing unit 27 of the management device 20 edits an operation instruction on a predetermined operation, which the agent device 10 executes before or after transmitting the IoT data, and stores the operation instruction in the operation instruction database DB3. The operation instruction transmission unit 28 transmits an operation instruction on the predetermined operation, which the agent device 10 executes before or after transmitting the IoT data, to the agent device 10. The content of the operation instruction stored in the operation instruction database DB3 is edited by the user of the management device 20 (e.g. administrator of the IoT data collection system 100). In the illustration in FIG. 2, the operation setting database DB2 and the operation instruction database DB3 are separate, but the operation setting database DB2 and the operation instruction database DB3 may be integrated into one database.

The authentication agent ID reception unit 31 of the server device 30 receives an authentication agent ID from the second transmission unit 12*b* of the agent device 10. The agent ID collation unit 32 collates the registered agent ID, which is registered in the registered agent ID database DB4 in advance, and the authentication agent ID. The IoT data reception unit 33 receives the IoT data from the agent device 10 when the result of collating the registered agent ID and the authentication agent ID is matched, and stores the IoT data in the IoT database DB5. The authentication agent ID and the registered agent ID are not necessary identical. The authentication agent ID and the registered agent ID may be different from each other, as long as the agent ID collation unit 32 can confirm collation.

Figure 3:
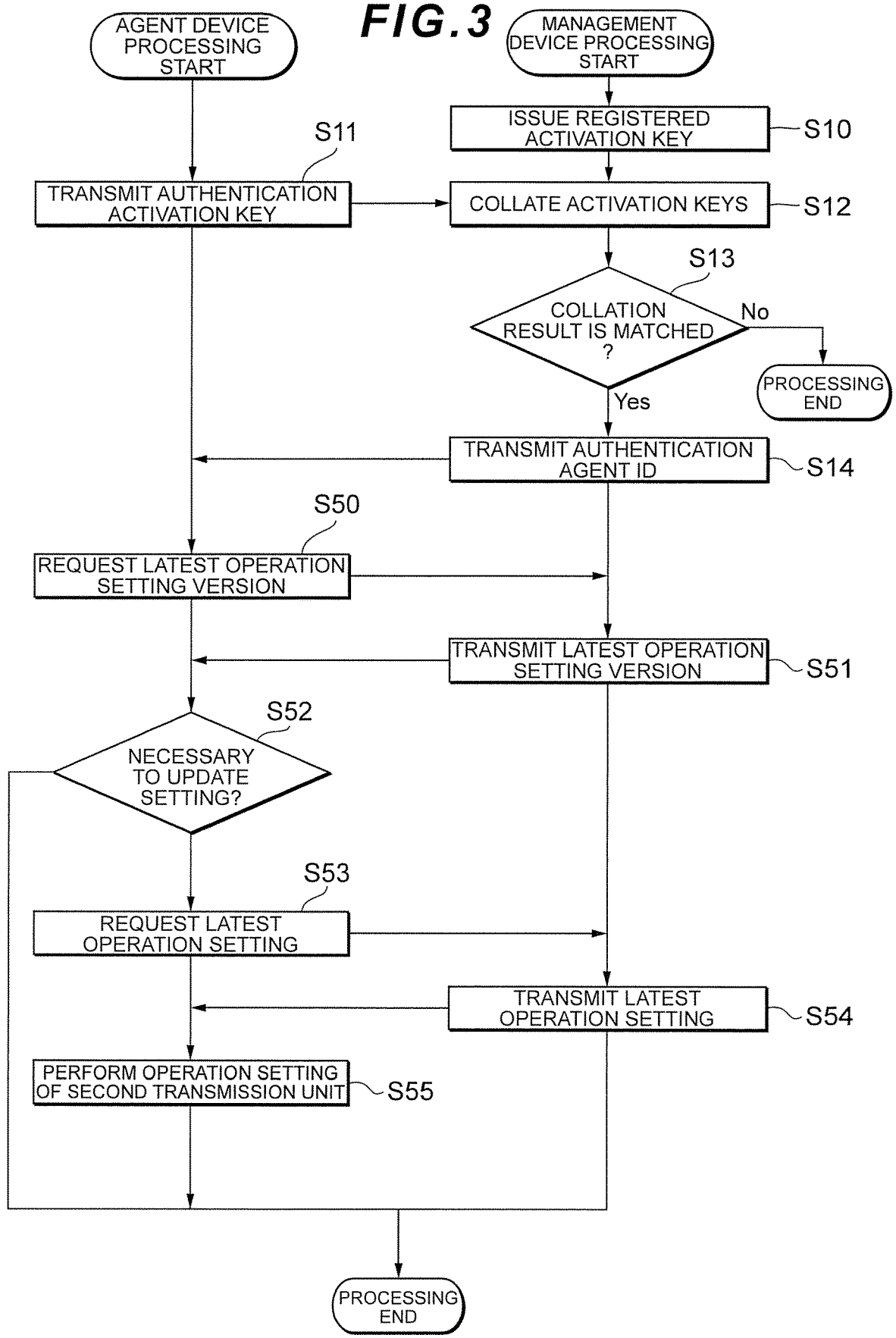
FIG. 3 is a flow chart depicting an activation processing and an operation setting processing performed by the agent device and the management device according to the embodiment of the present invention.

FIG. 3 is a flow chart depicting the activation processing and the operation setting processing that are performed by the agent device 10 and the management device 20 according to the embodiment of the present invention. The activation processing is a processing that is performed at least when the agent device 10 is initially started up, to confirm that the agent device 10 is an authentication device included in the IoT data collection system 100. The timing of performing the activation processing is not necessarily limited to the initial startup of the agent device 10. The management device 20 may determine whether the agent device 10 has already been activated by checking for the generation of the authentication agent ID or the presence of a flag, and perform the activation processing when the activation has not yet been performed.

The management device 20 issues the registered activation key, and stores it in the registered activation key database DB1 in advance (S10). The registered activation key may be a random character string or a numeric string, and be managed sub rosa. In an agent device 10, an authentication activation key corresponding to the registered activation key is assigned in a format which the user cannot change. An authentication activation key is assigned to the agent device 10 during the manufacturing stage or shipment stage, for example.

The agent device 10 transmits the authentication activation key assigned to this agent device 10 to the management device 20 at least at the initial startup (S11). The management device 20 collates the authentication activation key and the registered activation key using the activation key collation unit 22 (S12). If the collation result is not matched (S13: No), the activation processing ends. However, the management device 20 may notify the failure of activation to the agent device 10 or the management device 20 when the collation result is not matched. By notifying the failure of activation to the management device 20, a countermeasure can be taken without letting the individual, who illegally attempted to activate the agent device 10, know of the failure of activation.

If the result of collating the authentication activation key and the registered activation key is matched (S13: Yes), the management device 20 transmits an authentication agent ID to the agent device 10 (S14). The authentication agent ID is issued only when the result of collating the authentication activation key and the registered activation key is matched, and is an ID for managing the agent devices 10 of which activation processing succeeded. Now the activation processing performed by the agent device 10 and the management device 20, according to this embodiment, ends.

According to the IoT data collection system 100 of this embodiment, the authentication activation key and the registered activation key are collated when the agent device 10 starts up, and the authentication agent ID is automatically assigned to the agent device 10 only when the collation is confirmed. This prevents startup of an agent device 10 due to an illegal activation attempt without having a valid authentication activation key and leakage of the authentication agent ID, and also makes the ID management of the agent devices 10 easier. Furthermore, the agent device 10 and the management device 20 execute the activation by autonomous distributed cooperative control. This makes it unnecessary for the administrator to execute activation for each agent device 10, and maintains low management man-hours of the administrator, even if a number of agent devices 10 increases.

The management device 20 may periodically issue a new registered activation key and assign the agent device 10 an authentication activation key corresponding to the time of shipment. For example, the management device 20 issues a new registered activation key every month, and assigns an authentication activation key, which corresponds to the month of shipment, to the agent device 10. By periodically issuing a new registered activation key like this, even if a previously issued authentication activation key is leaked, continuous attempts at illegal activation using the leaked authentication activation key can be prevented. This prevents the illegal activation of the agent device 10 and the leakage of the authentication agent ID, and ensures security of the transfer of the IoT data.

After the management device 20 transmits the authentication agent ID to the agent device 10 (S14), the agent device 10 transmits a request for version information of the latest operation setting (information to specify the latest operation setting) of the second transmission unit 12b to the management device 20 periodically or at least before acquiring the IoT data (S50). Concrete content of the operation setting will be described in detail later with reference to FIG. 6. When the request for the version information of the latest operation setting is received, the management device 20 transmits the version information of the latest operation setting to the agent device 10 (S51). The determination unit 15 of the agent device 10 compares the version information of the latest operation setting and the version information of the current operation setting, and determines whether it is necessary to perform the operation setting of the second transmission unit 12b, based on the latest operation setting (S52). If the version information of the latest operation setting is different from the version information of the current operation setting (the numeric value of the version information of the latest operation setting is greater than the numeric value of the version information of the current operation setting), the determination unit 15 determines that it is necessary to perform the operation setting of the second transmission unit 12b based on the latest operation setting. If the version information of the latest operation setting is the same as the version information of the current operation setting (the numeric value of the version information of the latest operation setting is the same as the numeric value of the version information of the current operation setting), on the other hand, the determination unit 15 determines that it is not necessary to perform the operation setting of the second transmission unit 12b based on the latest operation setting. If it is determined that the version information of the latest operation setting of the agent device 10 is the same as the version information of the current operation setting, or if it is determined that there is no need to update the operation setting due to an exceptional reason (S52: No), the operation setting processing ends.

If it is determined that that the version information of the latest operation setting of the agent device 10 is different from the version information of the current operation setting, and the operation setting must be updated (S52: Yes), the agent device 10 transmits a request for the latest operation setting to the management device 20 (S53). The management device 20 transmits the latest operation setting to the agent device 10 (S54). The agent device 10 performs the operation setting of the second transmission unit 12*b* based on the latest operation setting using the setting unit 14 (S55).

According to the IoT data collection system 100 of this embodiment, the agent device 10 itself can update the operation setting to the latest operation setting under a stable operation environment, at a timing that avoids a time of executing high load processing, such as a time when the agent device 10 is transferring the IoT data to the server device 30. Therefore the agent device 10 can acquire IoT data based on the latest operation setting and transfer the IoT data to the server device 30.

The setting unit 14 of the agent device 10 sets a transfer condition to transmit IoT data to the server device 30 based on the latest operation setting. For example, based on the latest operation setting, the setting unit 14 of the agent device 10 sets the condition on the volume of the IoT data stored in the storage unit 11, or sets the condition on the intervals of the time to check the volume of the IoT data stored in the storage unit 11. According to the IoT data collection system 100 of this embodiment, the condition to transfer the IoT data from the agent device 10 to the server device 30 can be appropriately changed, and efficient transfer in accordance with the characteristics of the IoT data can be performed. Further, distribution processing in the agent device 10 can be performed to determine whether the operation setting of the second transmission unit 12*b* of the agent device 10 is necessary, hence concentration of the load of this processing to the management device 20 can be prevented even if a number of agent devices 10 increases, and the availability of the IoT data collection system 100 can be maintained and improved as a whole. Furthermore, the agent device 10 and the management device 20 execute operation setting update processing by autonomous distributed cooperative control, which makes it unnecessary for the administrator to perform operation setting for each agent device 10, and maintains low management man-hours of the administrator, even if a number of agent devices 10 increases.

Figure 4:
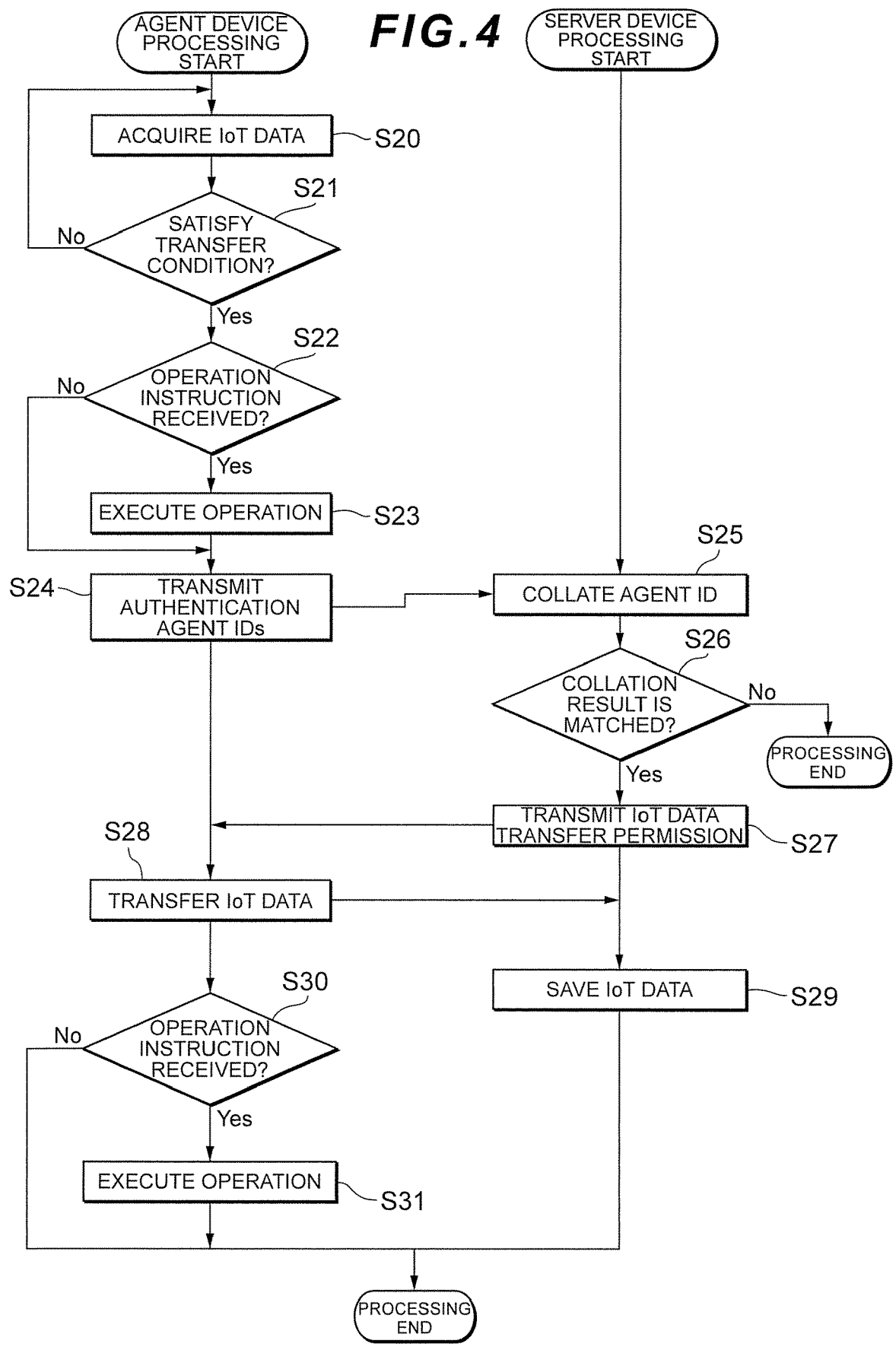
FIG. 4 is a flow chart depicting a transfer processing performed by the agent device and the server device according to the embodiment of the present invention.

FIG. 4 is a flow chart depicting the transfer processing that is performed by the agent device 10 and the server device 30 according to the embodiment of the present invention. The transfer processing is executed after the activation processing and the operation setting of the second transmission unit 12*b*, which were described with reference to FIG. 3, are performed.

The agent device 10 acquires IoT data from the sensor 2 and stores the IoT data in the storage unit 11 (S20). The agent device 10 periodically determines whether the transfer condition of the IoT data is satisfied (S21). Here the transfer condition of the IoT data is determined based on the operation setting that is transmitted from the management device 20, and may be a condition that the volume of the IoT data stored in the storage unit 11 is at least a predetermined value. The interval to determine whether the transfer condition of the IoT data is satisfied is set based on the operation setting transmitted from the management device 20, and is one minute, for example.

If the transfer condition of the IoT data is satisfied (S21: Yes), the agent device 10 confirms the operation instruction stored in the storage unit 11, and determines whether there is a predetermined operation to be executed before transmitting IoT data (S22). If there is a predetermined operation to be executed before transmitting IoT data (S22: Yes), the agent device 10 executes the predetermined operation based on the operation instruction (S23). Here the predetermined operation to be executed before transmitting IoT data is, for example, unifying the format of the IoT data, converting the layout, purging (eliminating illegal data) and the like. If execution of the predetermined operation is completed, or if there is no predetermined operation to execute before transmitting IoT data (S22: No), then the agent device 10 transmits an authentication agent ID, assigned to this agent device 10, to the server device 30 (S24). The server device 30 collates the authentication agent ID and the registered agent ID using the agent ID collation unit 32 (S25). If the result of collating the authentication agent ID and the registered agent ID is not matched (S26: No), the transfer processing ends without receiving the transfer of the IoT data. However, when the collation result is not matched, the server device 30 may notify the failure of collation to the agent device 10 or the management device 20. By notifying of the failure of collation to the management device 20, a countermeasure can be taken without letting the individual, who illegally attempted to transfer the IoT data from the agent device 10, know the failure of collation.

If the result of collating the authentication agent ID and the registered agent ID is matched (S26: Yes), the server device 30 transmits a transfer permission notice, which permits the transfer of the IoT data, to the agent device 10 (S27). Upon receiving the transfer permission notice, the agent device 10 transfers the IoT data to the server device 30 (S28). The server device 30 stores the IoT data in the IoT database DB5 (S29). The server device 30 may store the IoT data linking to the registered agent ID of the agent device 10 which transmitted the IoT data.

(Effect of Agent ID Collation and Leakage Prevention)

According to the IoT data collection system 100 of this embodiment, the authentication agent ID and the registered agent ID are collated when the IoT data is transferred from the agent device 10 to the server device 30, so as to ensure the security of the transfer. Further, even if the authentication agent ID is leaked, the agent device 10 cannot be activated because the authentication activation key is not available, which ensures security of transfer of the IoT data.

After transferring the IoT data, the agent device 10 confirms the operation instruction stored in the storage unit 11, and determines whether there is a predetermined operation to be executed after transmitting the IoT data (S30). If there is a predetermined operation to be executed after transmitting IoT data (S30: Yes), the agent device 10 executes the predetermined operation based on the operation instruction (S31). Here the predetermined operation to be executed after transmitting the IoT data is, for example, linking to other systems and applications. Then the transfer processing, performed by the agent device 10 and the server device 30 according to this embodiment, ends.

Figure 5:
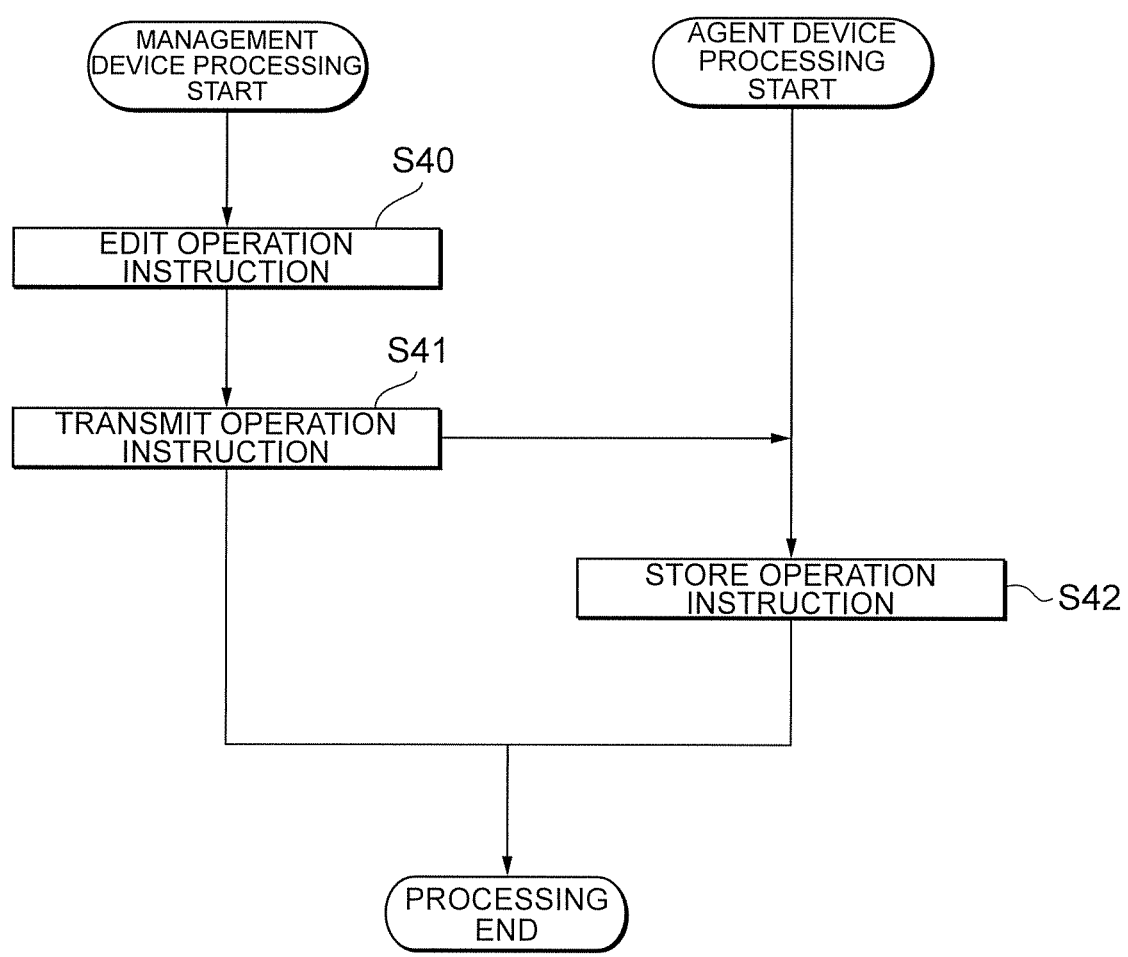
FIG. 5 is a flow chart depicting an operation instruction setting processing performed by the management device and the agent device according to the embodiment of the present invention.

FIG. 5 is a flow chart depicting an operation instruction setting processing performed by the management device 20 and the agent device 10 according to the embodiment of the present invention. The operation instruction setting processing is a processing that the agent device 10 performs for the server device 30 before transmitting the IoT data. The management device 20 edits the operation instruction for a predetermined operation, which the agent device 10 executes before or after transmitting the IoT data, using the operation instruction editing unit 27 (S40). The edited operation instruction is stored in the operation instruction database DB3. The edited operation instruction is transmitted to the agent device 10 by the operation instruction transmission unit 28 (S41). The agent device 10 receives the operation instruction and stores the instruction in the storage unit 11 (S42).

According to the IoT data collection system 100 of this embodiment, the operation performed by the agent device 10 can be specified before or after the agent device 10 transfers the IoT data to the server device 30, and more diversified data processing can be implemented.

Figure 6:
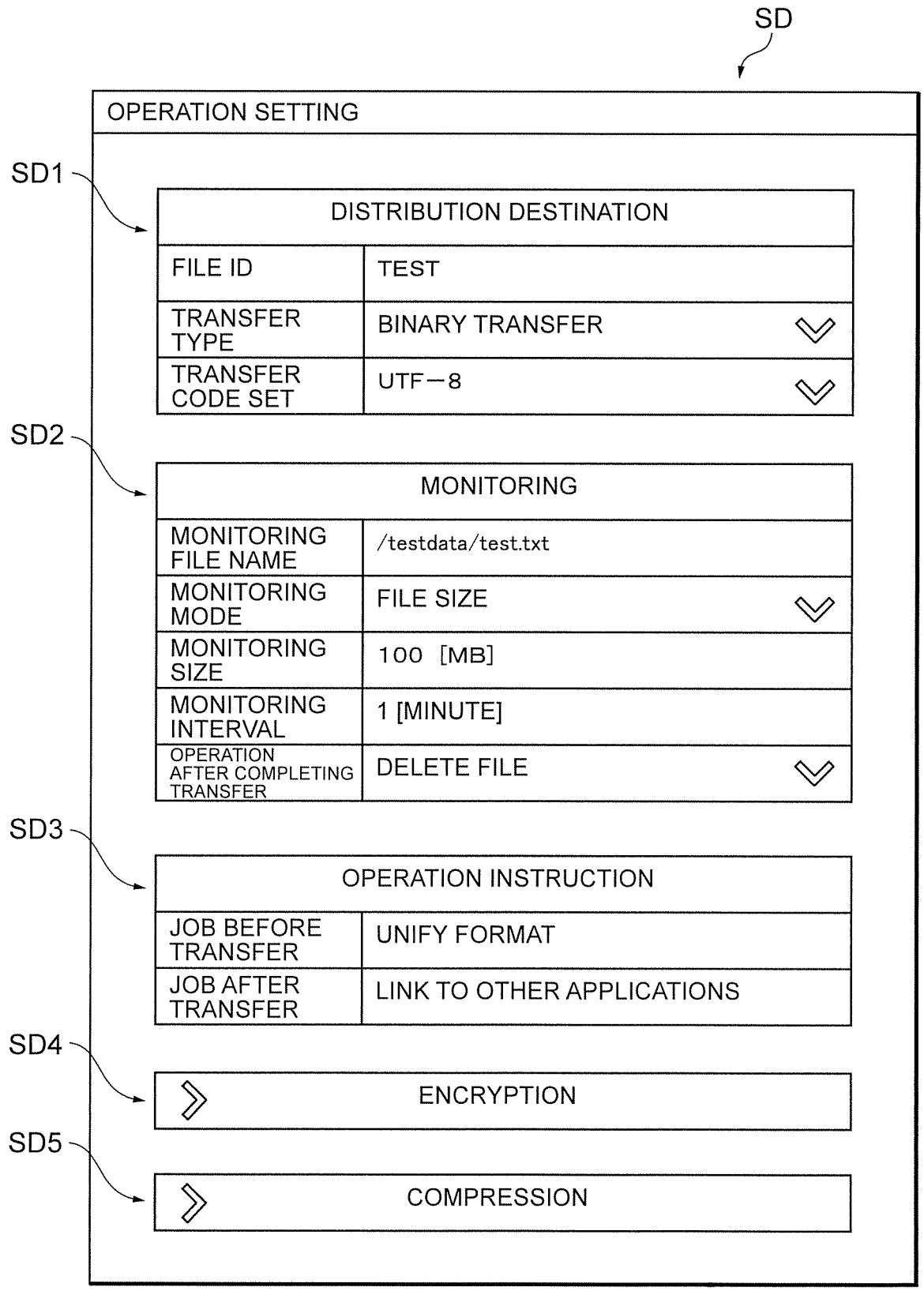
FIG. 6 is an example of the content of the operation setting that is stored in the management device according to the embodiment of the present invention.

FIG. 6 is an example of the content of the operation setting SD that is stored in the management device 20 according to the embodiment of the present invention. The operation setting SD includes a distribution destination SD1, a monitoring SD2, an operation instruction SD3, encryption SD4 and compression SD5. The operation setting SD is displayed on the display unit of the management device 20, and can be edited.

The distribution destination SD1 is setting data on the transfer of IoT data from the agent device 10 to the server device 30. The distribution destination SD1 includes items of a file ID, a transfer type and a transfer code set. The file ID is an ID which the server device 30 assigns to the transferred IoT data, and is "TEST" in this example. The transfer type and the transfer code set indicate the transfer protocol when the IoT data is transferred from the agent device 10 to the server device 30. In the case of this example, the transfer type is a "binary transfer", and the transfer code set is "UTF-8". The user can change the transfer type and the transfer code set respectively by using a selection tab included in the distribution destination SD1.

The monitoring SD2 includes a monitoring file name, a monitoring mode, a monitoring size, a monitoring interval and an operation after completing transfer. The monitoring file name indicates a file name of a file to be transferred, out of the files stored in the storage unit 11, and "/testdata/test.txt" in the case of this example. The monitoring mode indicates a monitoring target, and is "file size", that is, a volume of data, in the case of this example. The monitoring size indicates the size of the target indicated in the monitoring mode, at which the transfer is started, and is "100 [MB]" in the case of this example. The monitoring interval indicates a time interval of operation to determine whether the monitoring target satisfies the condition indicated by the monitoring size, and is "1 [minute]" in the case of this example. The operation after completing transfer indicates how to process the IoT data stored in the storage unit 11 of the agent device 10 after the IoT data is transferred from the agent device 10 to the server device 30, and is "delete the file" in the case of this example. The user can change the monitoring mode and the operation after completing the transfer using the selection tab included in the monitoring SD2. To specify the monitoring file name, a wild card character "*" may be used, and if "/testdata/*.txt" is specified, for example, all the text files included in the testdata folder can be specified as the monitoring target.

The operation instruction SD3 includes a job before transfer and a job after transfer. The job before transfer indicates a predetermined operation which the agent device 10 performs before transferring IoT data. In the case of this example, the job before transfer is the "unify format", that is, processing to unify the format of the IoT data is performed. The job after transfer indicates a predetermined operation which the agent device 10 performs after transferring IoT data. In the case of this example, the job after transfer is to "link to other applications", that is, an operation linking to other applications is performed. The user can edit the operation instruction using the management device 20.

Encryption SD4 specifies the encryption processing that is performed when IoT data is transferred. Compression SD5 specifies the compression processing that is performed when IoT data is transferred. For the encryption SD4 and the compression SD5, a more detailed specification can be set by pressing the expand tab.

Embodiments of the IoT data collection system 100 is not limited to those described above. For example, the agent device 10 may transmit information to specify the current operation setting (version information) to the management device 20 periodically or at least before acquiring the IoT data. The management device 20 may include a determination unit, so that this determination unit of the management device 20 determines the necessity of an update of the operation setting by comparing the information to specify the current operation setting and the information to specify the latest operation setting, and if it is determined that an update of the operation setting is necessary, the latest operation setting is transmitted from the management device 20 to the agent device 10.

The information to specify the current operation setting of the second transmission unit 12*b* of the agent device 10 is not limited to the version information, and may be any form of information, such as information using a flag which indicates that a change occurred to the content of the operating setting. In the case when it is determined that an update of the operation setting of the second transmission unit 12*b* of the agent device 10 is necessary, the latest operation setting, which is transmitted from the management device 20 to the agent device 10, may be difference information of the operation setting based on the update history of the content of the operation setting of the second transmission unit 12*b* of the agent device 10, which is stored in the operation setting database DB2, edited by the user of the management device 20 (e.g. administrator of the IoT data collection system 100), and the setting unit 14 of the agent device 10 may update the difference portion of the operation setting of the second transmission unit 12*b* based on this difference information of the operation setting.

The device, which edits the operation setting of the second transmission unit 12*b* of the agent device 10 and stores and manages the update history, may be disposed separately from the management device 20. The transfer condition for the agent device 10 to transmit the IoT data to the server device 30 may be a condition whether the time of the timer included in the agent device 10 passed a predetermined date and time, or a condition whether the elapsed time since the IoT data stored in the storage unit 11 of the agent device 10 is collected from the sensor 2 is at least a predetermined time, or may be periodical. Further, the operation instruction setting processing performed by the management device 20 and the agent device 10 are not limited to the method in which the agent device 10 edits the operation instruction, for a predetermined instruction executed before or after transmitting the IoT data, using the operation instruction editing unit 27 of the management device 20, stores the instruction in the operation instruction database DB3, then transmits the instruction to the agent device 10 using the operation instruction transmission unit 28. For example, similarly to the operation setting update processing performed by the second transmission unit 12*b* of the agent device 10, a process in which processing is performed by the management device 20 and the agent device 10 cooperatively in autonomous and distributed manner can be used.

The server device 30 may include an operation execution unit which executes a predetermined operation executed after receiving IoT data, based on the operation instruction for this predetermined operation. In this case, the management device 20 edits the operation instruction of the server device 30 using the operation instruction editing unit 27, and transmits the edited operation instruction to the server device 30 using the operation instruction transmission unit 28. The server device 30 may execute the operation to transfer the IoT data to another database or the like using the operation instruction execution unit based on the operation instruction, after receiving the IoT data, for example. The operation instruction may be transmitted to the agent device 10 after being edited by the management device 20, and when the authentication agent ID is transmitted from the agent device 10 to the server device 30, this operation instruction may be transmitted together with the authentication agent ID.

The embodiments described above are for assisting the understanding of the present invention, and are not intended to limit the scope of the present invention. Each composing element of the embodiments, and the arrangement, material, conditions, shape and size thereof are not limited to those exemplified above, but may be modified appropriately. Further, composing elements indicated in different embodiments may be partially replaced or combined.

What is claimed is:

1. A IoT data collection system comprising an agent device configured to acquire IoT data, a management device configured to manage the agent device, and a server device configured to receive the IoT data from the agent device,
    wherein the agent device includes a first transmission unit configured to transmit an authentication activation key to the management device at startup,
    wherein the management device includes:
    a collation unit configured to collate a registered activation key which is registered in advance and the authentication activation key; and
    a transmission unit configured to transmit an authentication agent ID, which is different from the registered activation key, to the agent device when the result of collating the registered activation key and the authentication activation key is matched,
    wherein the agent device further includes a second transmission unit configured to automatically transmit the IoT data and the authentication agent ID to the server device,
    wherein the server device includes:
    a collation unit configured to collate a registered agent ID which is registered in advance and the authentication agent ID;
    a reception unit configured to receive the IoT data from the agent device when the result of collating the registered agent ID and the authentication agent ID is matched;
    wherein the authentication activation key is common for a plurality of the agent devices, and
    the authentication agent ID is an ID that is unique to each of the plurality of the agent devices.

2. The IoT data collection system according to claim 1,
    wherein the agent device further includes a third transmission unit configured to transmit a request for information to specify the latest operation setting of the second transmission unit to the management device at least before acquiring the IoT data or periodically,
    wherein the management device further includes an operation setting transmission unit configured to transmit the information to specify the latest operation setting to the agent device when the request for the information to specify the latest operation setting is received,
    wherein the agent device further includes a determination unit configured to compare the information to specify the latest operation setting and the information to specify the current operation setting of the second transmission unit, and determine whether it is necessary to perform the operation setting of the second transmission unit based on the latest operation setting,
    wherein the third transmission unit transmits a request for the latest operation setting of the second transmission unit to the management device when the determination unit determines that it is necessary to perform the operation setting of the second transmission unit,
    wherein the operation setting transmission unit transmits the latest operation setting to the agent device when the request for the latest operation setting is received,
    wherein the agent device further includes a setting unit configured to perform the operation setting of the second transmission unit based on the latest operation setting.

3. The IoT data collection system according to claim 2, wherein the setting unit sets a transfer condition, which indicates a condition to transmit the IoT data to the server device, based on the latest operation setting.

4. The IoT data collection system according to claim 2,
    wherein the management device further includes a transmission unit configured to transmit an operation instruction for a predetermined operation, which the agent device executes before or after transmitting the IoT data, to the agent device; and
    wherein the agent device further includes an operation execution unit configured to execute the predetermined operation, based on the operation instruction, before or after transmitting the IoT data.

5. A method of collecting IoT data using an agent device configured to acquire IoT data, a management device configured to manage the agent device, and a server device configured to receive the IoT data from the agent device, which comprises the steps of:
    transmitting an authentication activation key from the agent device to the management device when the agent device starts up;
    collating a registered activation key which is registered in advance and the authentication activation key using the management device;
    transmitting an authentication agent ID, which is different from the registered activation key, from the management device to the agent device when the result of collating the registered activation key and the authentication activation key by the management device is matched;
    automatically transmitting the IoT data and the authentication agent ID from the agent device to the server device;
    collating a registered agent ID which is registered in advance and the authentication agent ID using the server;
    the server device receiving the IoT data from the agent device when the result of collating the registered agent ID and the authentication agent ID by the server device is matched;
    wherein the authentication activation key is common for a plurality of the agent devices, and
    the authentication agent ID is an ID that is unique to each of the plurality of the agent devices.

6. A management device which manages an agent device configured to acquire IoT data, comprising:

a collation unit configured to collate a registered activation key which is registered in advance and an authentication activation key which is transmitted from the agent device to the management device when the agent device starts up;

a transmission unit configured to transmit an authentication agent ID, which is different from the registered activation key, to the agent device when the result of collating the registered activation key and the authentication activation key is matched;

wherein the authentication activation key is common for a plurality of the agent devices, and the authentication agent ID is an ID that is unique to each of the plurality of agent devices.

7. A management program causing a computer, included in a management device which manages an agent device configured to acquire IoT data, to function as:

a collation unit configured to collate a registered activation key which is registered in advance and an authentication activation key which is transmitted from the agent device to the management device when the agent device starts up; and a transmission unit configured to transmit an authentication agent ID, which is different from the registered activation key, to the agent device when the result of collating the registered activation key and the authentication activation key is matched;

wherein the authentication activation key is common for a plurality of the agent devices; and the authentication agent ID is an ID that is unique to each of the plurality of agent devices.

8. An agent device configured to acquire IoT data, comprising:

a first transmission unit configured to transmit an authentication activation key to a management device which manages the agent device at startup;

a second transmission unit configured to automatically transmit an authentication agent ID and the IoT data to the server device, the authentication agent ID being different from a registered activation key which is registered in the management device in advance and being transmitted from the management device to the agent device when the management device collates the registered activation key and the authentication activation key, and the result of collating the registered activation key and the authentication activation key is matched;

wherein the authentication activation key is common for a plurality of the agent devices, and the authentication agent ID is an ID that is unique to each of the plurality of the agent devices.

9. An agent program causing a computer, which is included in an agent device configured to acquire IoT data, to function as:

a first transmission unit configured to transmit an authentication activation key to a management device which manages the agent device at startup;

a second transmission unit configured to automatically transmit an authentication agent ID and the IoT data to the server device, the authentication agent ID being different from a registered activation key which is registered in the management device in advance and being transmitted from the management device to the agent device when the management device collates the registered activation key and the authentication activation key, and the result of collating the registered activation key and the authentication activation key is matched;

wherein the authentication activation key is common for a plurality of the agent devices, and the authentication agent ID is an ID that is unique to each of the plurality of the agent devices.

* * * * *